(12) United States Patent
Brants et al.

(10) Patent No.: US 8,140,321 B1
(45) Date of Patent: *Mar. 20, 2012

(54) SEMANTIC UNIT RECOGNITION

(75) Inventors: Thorsten Brants, Palo Alto, CA (US); Jay Ponte, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/503,771

(22) Filed: Jul. 15, 2009

Related U.S. Application Data

(63) Continuation of application No. 10/748,654, filed on Dec. 31, 2003, now Pat. No. 7,580,827.

(51) Int. Cl.
*G06F 17/20* (2006.01)
(52) U.S. Cl. .................. 704/1; 704/9; 704/257
(58) Field of Classification Search ............... 704/1–10, 704/251–255, 257, 270, 270.1
See application file for complete search history.

(56) References Cited

U.S. PATENT DOCUMENTS

| | | |
|---|---|---|
| 6,292,771 B1 | 9/2001 | Haug et al. |
| 6,553,373 B2 | 4/2003 | Boguraev et al. |
| 7,249,121 B1 | 7/2007 | Bharat et al. |

OTHER PUBLICATIONS

Pearce, Darren "A Comparative Evaluation of Collocation Extraction Techniques" 3rd International Conference on Language Resource and Evaluation, LAS, 2002.*
Pending U.S. Appl. No. 10/748,654, filed Dec. 31, 2003 entitled "Semantic Unit Recognition", 32 pages.
J. Zhang; J. Gao; and M. Zhou, "Extraction of Chinese Compound Words—An experimental study on a very large corpus" of the second Chinese Language Processing Workshop, 2000.
H. Jing; and E. Tzoukermann, "Information Retrieval Based on Context Distance and Morphology", SIGIR conference on Research and Development in Information, 1999.

* cited by examiner

*Primary Examiner* — Huyen X. Vo
(74) *Attorney, Agent, or Firm* — Harrity & Harrity, LLP

(57) ABSTRACT

A semantic locator determines whether input sequences form semantically meaningful units. The semantic locator includes a coherence component that calculates a coherence of the terms in the sequence and a variation component that calculates the variation in terms that surround the sequence. A heuristics component may additionally refine results of the coherence component and the variation component. A decision component may make the determination of whether the sequence is a semantic unit based on the results of the coherence component, variation component, and heuristics component.

28 Claims, 5 Drawing Sheets

SEMANTIC UNIT RECOGNITION

RELATED APPLICATIONS

This application is a continuation of U.S. application Ser. No. 10/748,654, filed Dec. 31, 2003, the disclosure of which is incorporated herein by reference.

BACKGROUND OF THE INVENTION

A. Field of the Invention

The present invention relates generally to information processing and, more particularly, to identifying multi-word text sequences that are semantically meaningful.

B. Description of Related Art

In some text processing applications, it can be advantageous to process multiple words in a sequence as a single semantically meaningful unit. For example, the author of the phrase "Labrador retriever" intends to refer to a specific type of dog. If this phrase was present in a search query, such as a search query input to an Internet search engine, it may be desirable to process the phrase as a single semantic unit rather than as the two separate words "Labrador" and "retriever."

Applications other than search engines may benefit from knowledge of semantic units. Named entity learning, segmentation in languages that do not separate words with spaces (e.g., Japanese and Chinese), and article summarization, for example, are some applications that may use semantic units.

Thus, there is a need in the art to be able to automatically recognize semantic units from within one or more textual documents.)

SUMMARY OF THE INVENTION

Consistent with aspects of the invention, multi-word text sequences are classified as semantic units based on the coherence of terms in the sequence and based on variation in the context of the sequence.

One aspect of the invention is directed to a method of identifying whether a sequence is a semantic unit. The method includes calculating a first value representing a coherence of terms in the sequence, calculating a second value representing variation of context in which the sequence occurs, and determining whether the sequence is a semantic unit based at least in part on the first and second values.

Another aspect of the invention is directed to a device that includes a coherence component, a variation component, and a decision component. The coherence component calculates a coherence of multiple terms in a sequence of terms. The variation component calculates a variation of context terms in a collection of documents in which the sequence occurs. The decision component determines whether the sequence constitutes a semantic unit based at least in part on results of the coherence component and the variation component.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

A semantic locator is described herein that identifies word sequences that form semantically meaningful units. The operation of the semantic locator is based on one or more factors calculated by comparing the terms in a candidate sequence to a collection of documents. In particular, the factors may include the coherence of the words in the sequence and the variation of the context surrounding the sequence.

System Overview

Figure 1:
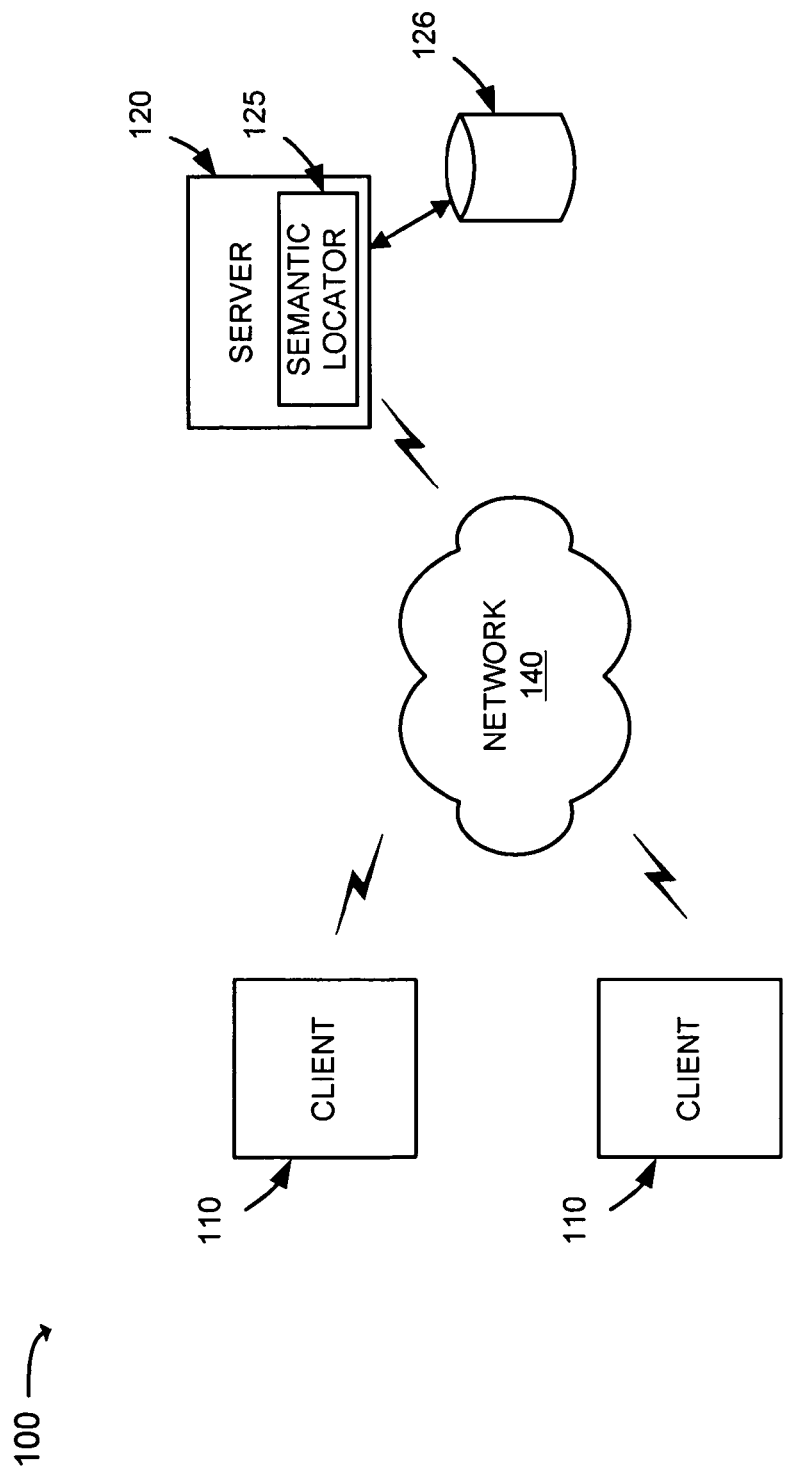
FIG. 1 is an exemplary diagram of a network in which principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and one server 120 have been illustrated as connected to network 140 for simplicity. In practice, there may be more clients and/or servers. Also, in some instances, a client may perform the functions of a server and a server may perform the functions of a client.

Clients 110 and server 120 may be implemented as a device, such as a wireless telephone, a personal computer, a personal digital assistant (PDA), a lap top, or another type of computation or communication device, a thread or process running on one of these devices, and/or an object executable by one of these devices. Clients 110 and server 120 may connect to network 140 via wired, wireless, or optical connections.

In an implementation consistent with the principles of the invention, server 120 may include semantic locator 125. In other implementations, semantic locator 125 may be implemented by one or more of clients 110. In general, semantic locator 125 determines multi-term (i.e., multi-word) semantically meaningful units by comparing candidate semantically meaningful units to document collection 126. For a large document collection 126, semantic locator may be implemented in parallel on multiple servers 120 and/or clients 110. In the context of the Internet, for example, server 120 may gather web documents (e.g., web pages) from other servers or client devices in network 100. Document collection 126 may include documents gathered from other sources. Semantic locator 125 may analyze these gathered web documents and locate semantic units from within the gathered web documents. The identified semantic units may be applied in a variety of possible applications, such as improving results of a search engine by identifying semantic units in search queries, identifying named entities, automated language translation, and in automated document summarization by identifying "non-break" points. The identified semantic units may generally define entities such as persons, things, places, companies, job titles, regularly used phrases, standard disclaimers, etc.

A document, as the term is used herein, is to be broadly interpreted to include any machine-readable and machine-storable work product. A document may be an e-mail, a news article, a file, a combination of files, one or more files with embedded links to other files, a news group posting, etc. In the context of the Internet, a common document is a web page. Web pages often include textual information and may include embedded information (such as meta information, images, hyperlinks, etc.) and/or embedded instructions (such as Java-script, etc.).

Exemplary Client/Server Architecture

Figure 2:
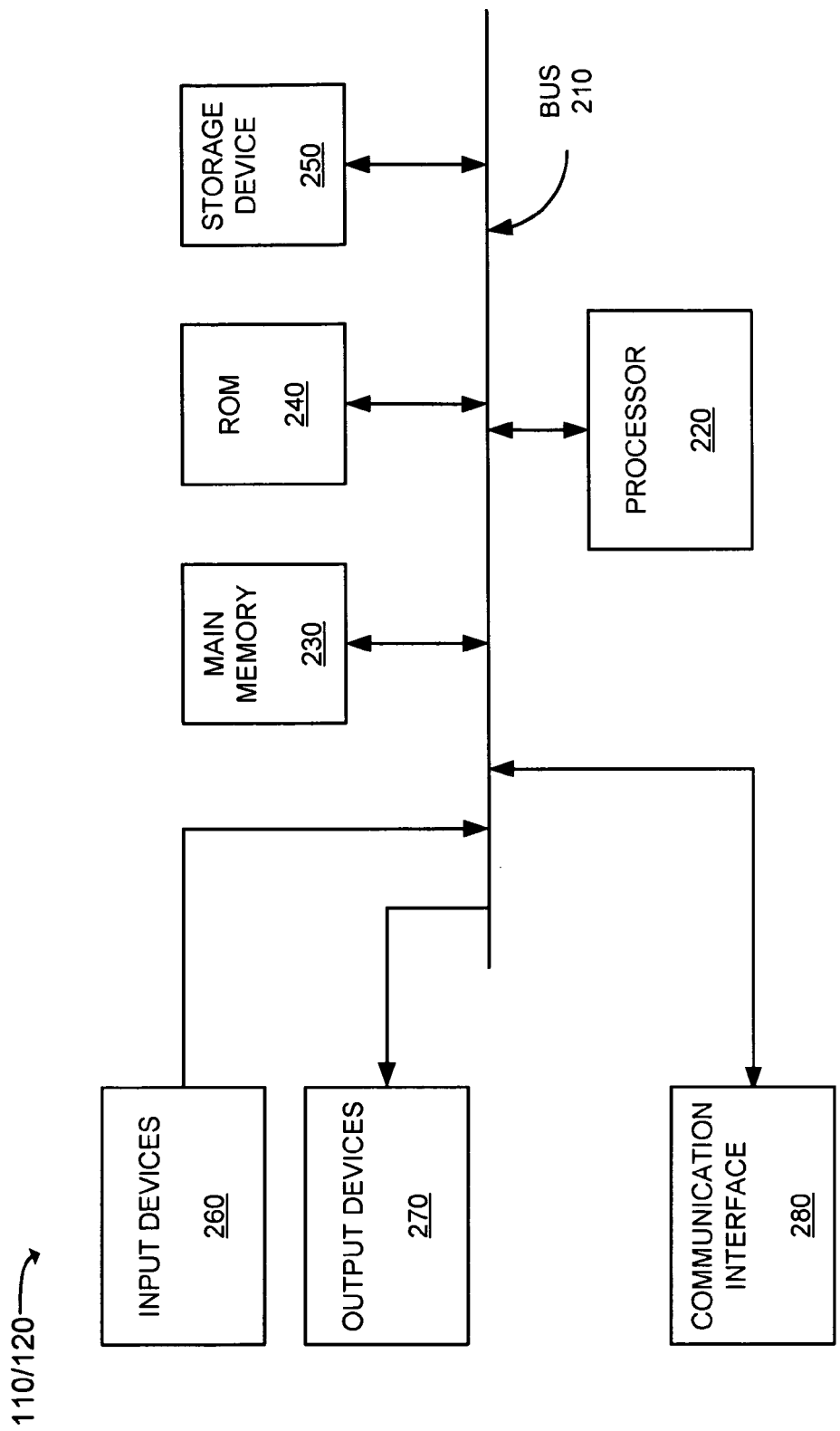
FIG. 2 is an exemplary diagram of a client or server shown in FIG. 1.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 140.

As will be described in detail below, server 120 or one or more of clients 110, consistent with the principles of the invention, locates semantically meaningful units by executing semantic locator 125. Semantic locator 125 may be stored in a computer-readable medium, such as memory 230. A computer-readable medium may be defined as one or more physical or logical memory devices and/or carrier waves.

The software instructions defining semantic locator 125 may be read into memory 230 from another computer-readable medium, such as data storage device 250, or from another device via communication interface 280. Data storage device 250 may additionally store documents (e.g., document collection 126) that semantic locator 125 analyzes to find the semantically meaningful units. As previously mentioned, document collection 126 may be gathered from network 100. The documents of document collection 126 may also be received from any other convenient source, such as another database.

The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Semantic Locator 125

Figure 3:
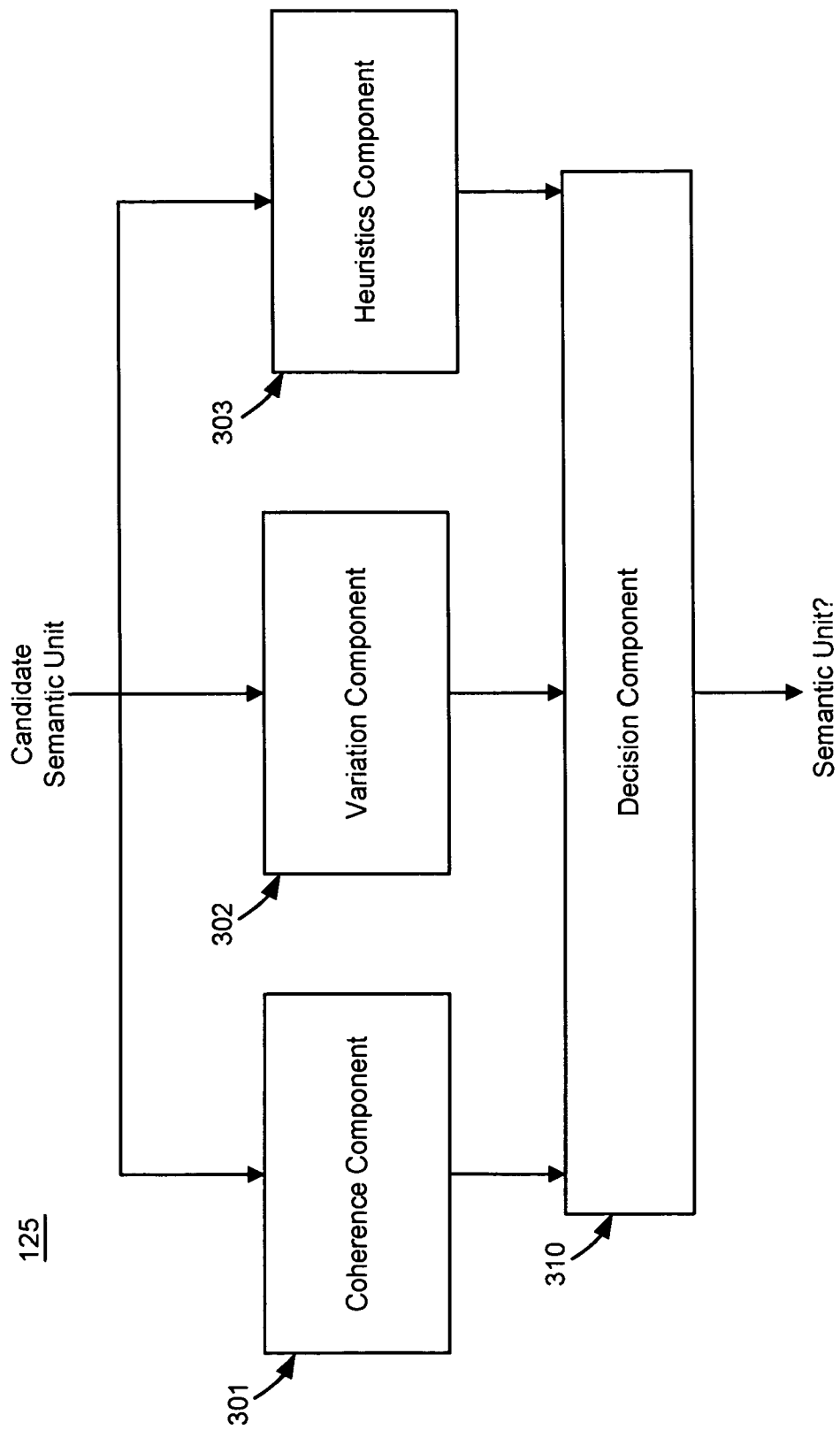
FIG. 3 is a block diagram conceptually illustrating an implementation of the semantic locator shown in FIG. 1.

FIG. 3 is a block diagram conceptually illustrating an implementation of semantic locator 125 in additional detail. Semantic locator 125 may receive candidate semantic sequences, such as, for example, multi-word sequences extracted from documents or input by a user. Semantic locator 125 determines whether the candidate semantic sequence should indeed be classified as semantic units. Semantic locator 125 may make this determination using a collection of pre-stored documents, such as document collection 126.

Semantic locator 125 may make its determination of whether a sequence should be considered a semantic unit based on one or more of the following factors: (a) the coherence of the terms in the sequence (i.e., how well the terms "stick" together) as measured based on document collection 126; (b) the variation in the surrounding context with which the sequence occurs in document collection 126; and (c) heuristics applied to the sequence. These factors may be evaluated by coherence component 301, variation component 302, and heuristics component 303, respectively. Based on the outputs of coherence component 301, variation component 302, and heuristics component 303, decision component 310 may make a final determination of whether the candidate semantic sequence is to be classified as a semantic unit. Although components 301-303 are illustrated as being implemented in parallel to one another, in other implementations, they may be implemented in series. Sequential processing has the potential advantage that results from an earlier component may be used to filter out candidate semantic sequences that are clearly not semantic units.

Coherence component 301 may calculate a measure of coherence as a likelihood ratio that defines the probability of the whole sequence occurring relative to occurrences of parts of the sequence. Higher coherence values) indicate that the sequence is more likely to be a semantic unit. One formula for calculating the coherence, LR, between two terms, A and B, that form a sequence is:

$$LR(A, B) = \frac{L(f(B), N)}{L(f(AB), f(A)) \cdot L(f(\sim AB), f(\sim A))}. \quad \text{(eq. 1)}$$

In equation (1), f(A) is the number of occurrences of term A in document collection 126 and f(~A) is the number of occurrences of a term other than term A in document collection 126. Similarly, f(B) is the number of occurrences of term B in document collection 126. N is the total number of events, i.e., the total number of terms in document collection 126. Further, f(AB) is the number of times term A is followed by term B and f(~AB) is the number of times a term other than A is followed by term B. Also, in equation (1), $$L(k, n) = \left(\frac{k}{n}\right)^k \cdot \left(1 - \frac{k}{n}\right)^{(n-k)}. \quad \text{(eq. 2)}$$

From equations (1) and (2), coherence component 301 can calculate the coherence metric LR for two terms A and B that together form the candidate semantic sequence. Thus, for the phrase "Palo Alto," for example, term A would be "Palo" and term B would be "Alto".

Coherence component 301 may extend equations (1) and (2) to sequences with more than two terms by segmenting the sequence into two "compound" terms, where a compound term can include two or more words, and then calculating LR for these two compound terms. This may be repeated for each possible two compound term segmentation of the sequence and taking the maximum LR value. For example, the phrase "brown labrador retriever" may be divided into the compound terms "brown labrador" and "retriever." Another division may be the terms "brown" and "labrador retriever." Thus, for this phrase, coherence component 301 may compute two values for LR and take the maximum value as the output coherence value.

There may be some sequences in which the LR value is relatively high, but nevertheless have a poor coherence. To filter out these sequences, coherence component 301 may additionally require that a coherent sequence satisfy a threshold, for example that the condition $$f(AB) > \frac{f(A) \cdot f(B)}{N}$$

is satisfied.

Variation component 302 may calculate a measure of the entropy of the context of the candidate semantic unit. More variation in surrounding terms tends to indicate that the sequence is more likely to be a semantic unit. In one implementation, the entropy, H(S), of a sequence, S, is calculated by variation component 302 using the formula:

$$H(S) = \text{MIN}(HL(S), HR(S)), \qquad (\text{eq. 3})$$

where HL(S) and HR(S) are the entropy to the left of the sequence and the entropy to the right of the sequence, as calculated using the following two formulae:

$$HL(S) = -\sum_w \frac{f(wS)}{f(S)} \cdot \log\left(\frac{f(wS)}{f(S)}\right), \qquad (\text{eq. 4})$$

and $$HR(S) = -\sum_w \frac{f(Sw)}{f(S)} \cdot \log\left(\frac{f(Sw)}{f(S)}\right). \qquad (\text{eq. 5})$$

In equations (4) and (5), f(wS) refers to the number of times a particular term, w, appears in document collection 126 followed by the sequence and f(Sw) refers to the number of times the sequence is followed by w. Similarly, f(S) refers to the number of times the sequence S is present in document collection 126. The sums in equations (4) and (5) are taken over all the terms w that appear to the immediate left of the phrase (equation 4) and the immediate right of the phrase (equation 5).

Figure 4:
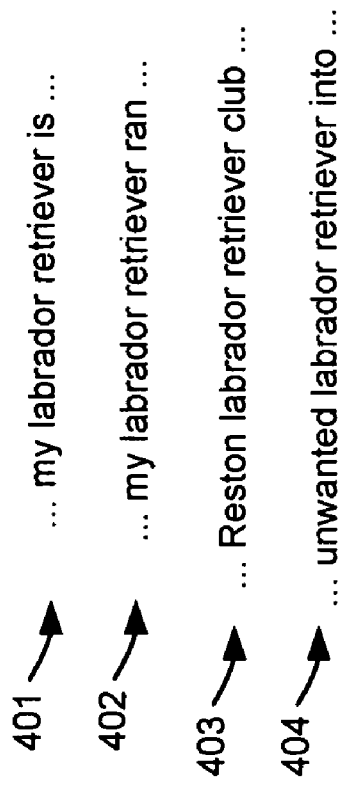
FIG. 4 is a diagram illustrating text snippets from an exemplary document collection.

As an example of the application of equations (3)-(5) by variation component 302, consider the phrase "labrador retriever" and an exemplary document collection that includes four occurrences of "labrador retriever." This situation is shown in FIG. 4, in which four snippets of text 401-404 are shown that correspond to the four occurrences of "labrador retriever" in a document collection 410. In this hypothetical, f(S) equals four. Also, f(wS) equals two, one, and one, respectively, when w equals "my," "Reston," and "unwanted." Similarly, f(Sw) equals one when w is equal to each of "is," "ran," "club, and "into." The resultant values are 0.45 and 0.60 for HL(S) and HR(S), respectively. Variation component 302 takes the final variation value, H(S), as 0.45—the minimum of these two values.

In one alternate implementation, variation component 302 may calculate an alternate value for the variation, HM(S). HM(S) is an approximation that may be computationally more feasible than H(S). A higher value for HM(S) implies more variation (i.e., that the candidate semantic sequence is more likely to be a semantic unit). Variation component 302 may calculate HM(S) as $$HM(S) = \text{MIN}(HLM(S), HRM(S)), \qquad (\text{eq. 6})$$

where HLM(S) is defined as the minimum of $$1 - \frac{f(wS)}{f(S)}$$

for each term w in document collection 126 and HRM(S) is defined as the minimum $$1 - \frac{f(Sw)}{f(S)}$$

of for each term w in document collection 126.

Other techniques, in addition to the two discussed above, may be used to measure variation. In another possible implementation, variation component 302 may calculate an alternate value for the variation, HC(S), as the number of possible continuations to the left and right of the candidate sequence. Variation component 302 may calculate HC(S) as $$HC(S) = \text{MIN}(HLC(S), HRC(S)), \qquad (\text{eq. 7})$$

where HLC(S) is defined as $$\sum_w \delta(wS),$$

where δ(X) is defined as one if sequence X occurs in the document collection and zero otherwise. Similarly, HRC(S) is defined as $$\sum_w \delta(Sw).$$

Higher values for HC(S) indicate better variation values.

Variation component 302 may calculate yet another possible alternate value for the variation, HP(S), as the number of possible continuations that are required to cover Q % of all cases in the document collection (where Q is, for example, 90). Here, $$HP(S) = \text{MIN}(HLP(S), HRP(S)), \qquad (\text{eq. 8})$$

in which HLP(S) is defined as the number of continuations w to the left of the candidate sequence that cover Q % and HRP(S) is defined as the number of continuations w to the right of the candidate sequence that cover Q %.

Heuristics component 303 may apply heuristics to the candidate semantic units. Heuristics component 303 may include a number of predefined rules designed to help determine if a sequence is a semantic unit. For example, only sequences for which the first and last terms are uppercase may be considered as possible semantic units. Heuristics component 303 may indicate that other sequences are not semantic units. Other possible rules may exclude sequences that start or end with stop words (i.e., "the," "an," etc.) or exclude sequences that include punctuation. Other possible rules may base a likelihood of a sequence being a semantic unit on the part-of-speech information for the terms in the sequence. One of ordinary skill in the art will appreciate that other rules could be used and may depend on the specific application for which the semantic locator is used.

Exemplary Processing

Figure 5:
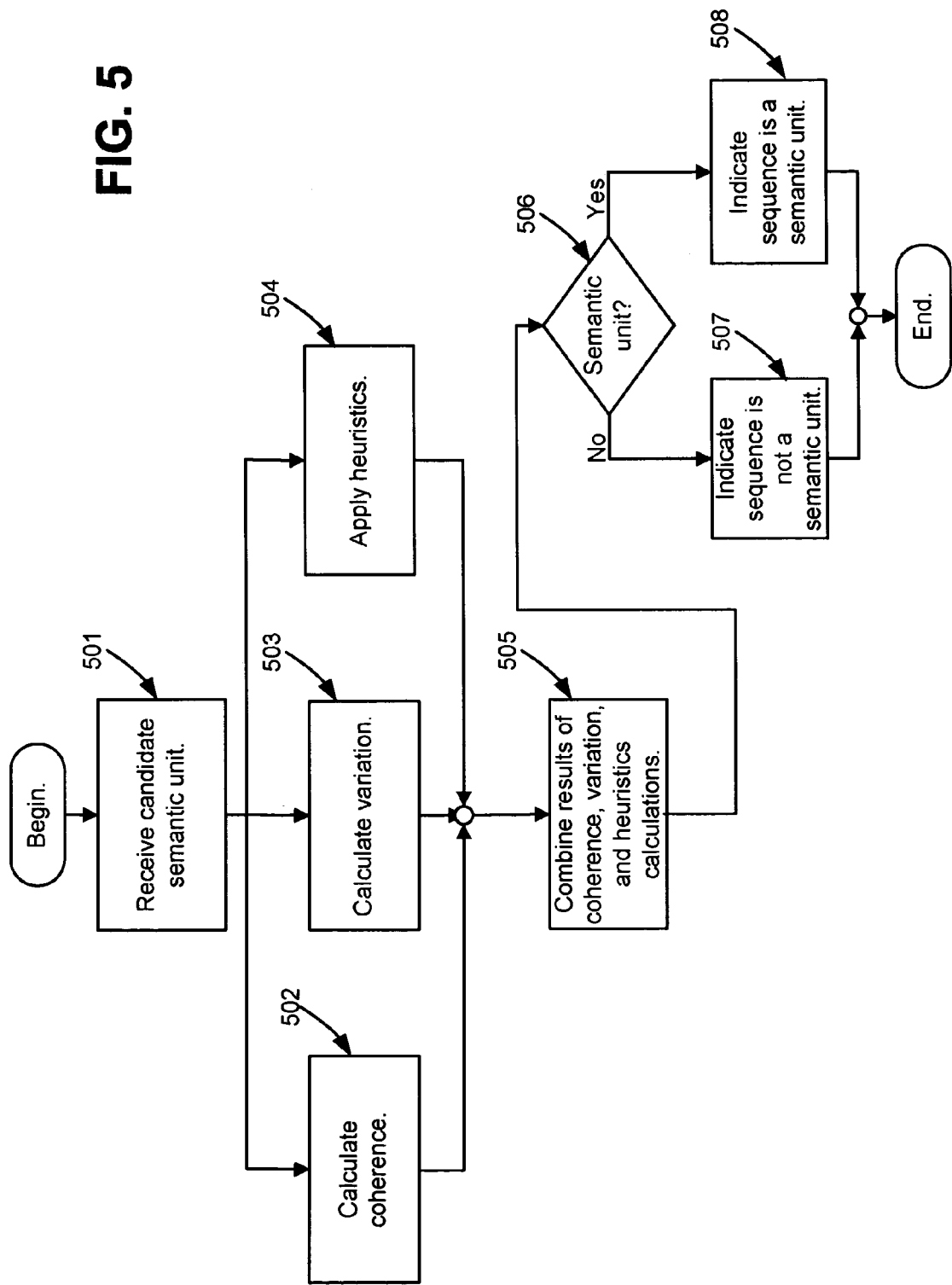
FIG. 5 is a flow chart illustrating operations consistent with aspects of the invention for determining whether a sequence is a semantic unit.

FIG. 5 is a flow chart illustrating operations consistent with aspects of the invention for determining whether a sequence is a semantic unit. To begin, semantic locator 125 may receive a candidate semantic sequence (act 501). The candidate semantic sequence may be received, for example, from a user (such as a user of one of clients 110), from a document, or from any other source. Coherence component 301, variation component 302, and heuristics component 303 may each generate one or more values, as described above, that quantify their analysis of the sequence (acts 502, 503, and 504). In some implementations; one or more of acts 502, 503, and 504 may optionally not be used. For example, in some implementations, act 504 may not be used. In other implementations, the values from coherence component 301 and variation component 302 may be precomputed for all or some of the possible semantic sequences. In this situation, acts 502 and 503 may be implemented as a lookup of the appropriate values in a table.

Decision component 310 may analyze the values from coherence component 301, variation component 302, and heuristics component 303 to determine whether the sequence is a semantic unit (act 505). Decision component 310 may, for example, determine that the sequence is a semantic unit when both H(S) and LR(S) are above a predetermined threshold value and heuristics component 303 does not exclude the sequence. One of ordinary skill in the art will recognize that numerous other techniques may be used to determine whether the sequence is a semantic unit based on the outputs from coherence component 301, variation component 302, and heuristics component 303.

Based on the result from decision component 310, semantic locator 125 may label the particular sequence as a semantic unit or as not a semantic unit (acts 506, 507, and 508).

CONCLUSION

As described above, a semantic locator performs operations consistent with aspects of the invention to determine whether a sequence of terms forms a semantically meaningful unit. The determination may be based on one or more of the coherence of the terms in the sequence and the variation of context surrounding the sequence. Additionally, in some implementations, heuristics may be applied to further refine the determination of a semantic unit.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method comprising:
    calculating, by one or more processors, a first value derived from coherence of terms in a sequence, where the coherence of the terms in the sequence is calculated relative to a first collection of documents;
    calculating, by one or more processors, a second value derived from a variation of context in which the sequence occurs, where the variation of context is calculated relative to a second collection of documents that differs from the first collection of documents;
    determining, by one or more processors, that the sequence is a semantic unit based on the first value, the second value, and one or more rules for excluding particular sequences; and
    labeling, by one or more processors, the sequence as a semantic unit.

2. The method of claim 1, further comprising:
    receiving a search query that includes a first term and a second term;
    determining that a sequence, of the first term and the second term, is labeled as the semantic unit; and
    searching the search query based on the first term and the second term being labeled as the semantic unit.

3. The method of claim 1, where the coherence of the terms in the sequence is calculated as a likelihood ratio that defines a probability of the sequence occurring in the first collection of documents relative to individual parts of the sequence occurring in the first collection of documents.

4. The method of claim 3, where the coherence of the terms in the sequence is calculated as:

$$LR(A, B) = \frac{L(f(B), N)}{L(f(AB), f(A)) \cdot L(f(\sim AB), f(\sim A))},$$

where f(A) defines a number of occurrences of term A in the first collection of documents, f(~A) defines a number of occurrences of a term other than term A in the first collection of documents, f(B) defines a number of occurrences of term B in the first collection of documents, N defines a total number of terms in the first collection of documents, f(AB) defines a number of times that term A is followed by term B in the first collection of documents, and f(~AB) is a number of times that a term other than A is followed by term B in the first collection of documents, where $$L(k, n) = \left(\frac{k}{n}\right)^k \cdot \left(1 - \frac{k}{n}\right)^{(n-k)},$$

where L(k,n) is a function defining a relationship between k and n, k=f(B), f(AB), or f(~AB), and n=N, f(A), or f(~A).

5. The method of claim 1, where determining that the sequence is the semantic unit includes:
determining that the first value exceeds a threshold associated with the coherence of the terms in the sequence.

6. The method of claim 5, where the threshold is defined as:

$$f(AB) > \frac{f(A) \cdot f(B)}{N},$$

, where f(A) defines a number of occurrences of term A in at least one of the first collection or the second collection of documents, f(B) defines a number of occurrences of term B in the at least one of the first collection or the second collection of documents, N defines a total number of terms in the at least one of the first collection or the second collection of documents, and f(AB) defines a number of times that term A is followed by term B in the at least one of the first collection or the second collection of documents.

7. The method of claim 1, where the variation of context is based on an entropy, H(S), that is calculated as $$H(S)=\text{MIN}(HL(S),HR(S)), \text{ where}$$

$$HL(S) = -\sum_w \frac{f(wS)}{f(S)} \cdot \log\left(\frac{f(wS)}{f(S)}\right),$$

and $$HR(S) = -\sum_w \frac{f(Sw)}{f(S)} \cdot \log\left(\frac{f(Sw)}{f(S)}\right),$$

where MIN defines a minimum operation, S represents the sequence, HL(S) is entropy left of the sequence, HR(S) is entropy right of the sequence, f(wS) defines a number of times that a particular term, w, appears in the second collection of documents followed by the sequence, f(Sw) refers to a number of times that the sequence is followed by w in the second collection of documents, and f(S) refers to a number of times that the sequence is present in the second collection of documents.

8. The method of claim 1, where the variation of context in which the sequence occurs, HM(S), is calculated as $$HM(S)=\text{MIN}(HLM(S),HRM(S)),$$

where MIN defines a minimum operation, HLM(S) is defined as a minimum of $$1 - \frac{f(wS)}{f(S)}$$

for each term w in the second collection of documents, HRM(S) is defined as a minimum of $$1 - \frac{f(Sw)}{f(S)}$$

for each term w in the second collection of documents, f(wS) defines a number of times that a particular term, w, appears in the second collection of documents followed by the sequence, f(Sw) refers to a number of times that the sequence is followed by w in the second collection of documents, and f(S) refers to a number of times that the sequence is present in the second collection of documents.

9. The method of claim 1, where the variation of context in which the sequence occurs, HC(S), is calculated as $$HC(S)=\text{MIN}(HLC(S),HRC(S)),$$

where MIN defines a minimum operation, HLC(S) is defined as $$\sum_w \delta(wS)$$

and HRC(S) is defined as $$\sum_w \delta(Sw),$$

, where δ(X) is defined as one if sequence X occurs in the second collection of documents and zero otherwise, where wS refers to a particular word followed by the sequence, and where Sw refers to the sequence followed by a word.

10. The method of claim 1, where the variation of context in which the sequence occurs, HP(S), is calculated as $$HP(S)=\text{MIN}(HLP(S),HRP(S))$$

where MIN defines a minimum operation, HLP(S) is defined as a number of continuations left of the sequence that cover a predetermined percentage of all cases in the second collection of documents and HRP(S) is defined as a number of continuations right of the sequence that cover the predetermined percentage of all cases in the second collection of documents.

11. The method of claim 1, where determining that the sequence is the semantic unit includes comparing the first value and the second value, respectively, to a first threshold and a second threshold and identifying the sequence as the semantic unit when the first value and the second value satisfy the first threshold and the second threshold.

12. The method of claim 1, where the sequence includes three or more words.

13. The method of claim 1, where determining, based on the first and second values, that the sequence is the semantic unit includes:
determining whether the first value exceeds a first threshold value;
determining whether the second value exceeds a second threshold value; and
identifying the sequence as the semantic unit in response to determining that the first value and exceeds the first threshold value and the second value exceeds the second threshold value.

14. The method of claim 1, where the variation of context is based on an entropy that is based on a distribution of terms that appear, in the second collection of documents, immediately before or after the sequence.

15. A device comprising:

a memory to store instructions;

a coherence processor to execute one or more of the instructions to calculate a coherence of multiple terms in a sequence of terms, where the coherence processor calculates the coherence of the multiple terms in the sequence relative to a first collection of documents in which the sequence occurs;

a variation processor to execute one or more of the instructions to calculate a variation of context terms in a second collection of documents that differs from the first collection of documents, where the variation processor calculates the variation of the context terms based on entropy of the context terms within the second collection of documents;

a heuristics processor to execute one or more of the instructions to apply one or more predefined rules to the sequence, where the one or more predefined rules relate to defining sequence of characters as semantic units, and a decision processor to execute one or more of the instructions to determine that the sequence constitutes a semantic unit based on the coherence of the multiple terms in the sequence, the variation of the context terms, and further based, at least in part, on application of the one or more predefined rules to the sequence.

16. The device of claim 15, where the context terms include terms occurring left and right, in the second collection of document, of the sequence.

17. The device of claim 15, where the coherence of the multiple terms in the sequence is calculated as a likelihood ratio that defines a probability of the sequence occurring in the first collection of documents relative to individual parts of the sequence occurring, without other parts of the sequence, in the first collection of documents.

18. The device of claim 15, where the entropy, H(S), is calculated as $$H(S)=\text{MIN}(HL(S),HR(S)), \text{where}$$

$$HL(S) = -\sum_w \frac{f(wS)}{f(S)} \cdot \log\left(\frac{f(wS)}{f(S)}\right), \text{ and}$$

$$HR(S) = -\sum_w \frac{f(Sw)}{f(S)} \cdot \log\left(\frac{f(Sw)}{f(S)}\right),$$

and where MIN defines a minimum operation, S represents the sequence, HL(S) is entropy left of the sequence, HR(S) is entropy right of the sequence, f(wS) defines a number of times that a particular term, w, appears in the second collection of documents followed by the sequence, f(Sw) refers to a number of times that the sequence is followed by w in the second collection of documents, and f(S) refers to a number of times that the sequence S is present in the second collection of documents.

19. The device of claim 15, where the variation of context in which the sequence occurs, HM(S), is calculated as $$HM(S)=\text{MIN}(HLM(S),HRM(S)),$$

where MIN defines a minimum operation, HLM(S) is defined as a minimum of $$1 - \frac{f(wS)}{f(S)}$$

for each term w in the second collection of documents, HRM(S) is defined as a minimum of $$1 - \frac{f(Sw)}{f(S)}$$

for each term w in the second collection of documents, f(wS) defines a number of times that a particular term, w, appears in the second collection of documents followed by the sequence, f(Sw) refers to a number of times that the sequence is followed by w in the second collection of documents, and f(S) refers to a number of times that the sequence is present in the second collection of documents.

20. The device of claim 15, where the variation of context in which the sequence occurs, HC(S), is calculated as $$HC(S)=\text{MIN}(HLC(S),HRC(S)),$$

where MIN defines a minimum operation, HLC(S) is defined as $$\sum_w \delta(wS)$$

and HRC(S) is defined as $$\sum_w \delta(Sw),$$

, where δ(X) is defined as one if sequence X occurs in the second collection of documents and zero otherwise, where wS refers to a particular word followed by the sequence, and where Sw refers to the sequence followed by a word.

21. The device of claim 15, where the variation of context in which the sequence occurs, HP(S), is calculated as $$HP(S)=\text{MIN}(HLP(S),HRP(S)),$$

where MIN defines a minimum operation, HLP(S) is defined as a number of continuations left of the sequence that cover a predetermined percentage of all cases in the second collection of documents, and HRP(S) is defined as a number of continuations right of the sequence that cover the predetermined percentage of all cases in the second collection of documents.

22. The device of claim 15, where the decision processor is further to:

compare the coherence of the multiple terms in the sequence and the variation of the context terms to threshold values, and identify the sequence as the semantic unit based on comparing the coherence of the multiple terms in the sequence and the variation of the context terms to the threshold values.

23. The device of claim 15, where the entropy is based on a distribution, within the second collection of documents, of the context terms.

24. A memory device to store programming instructions to control at least one processor, the programming instructions comprising:

instructions for calculating a first value representing a coherence of terms in a sequence of terms, where the instructions for calculating the first value include:
  instructions for calculating the coherence of the terms in the sequence relative to a first collection of documents;
instructions for calculating a second value representing variation of context of the sequence, where the instructions for calculating the second value include:
  instructions for calculating entropy of the context of the sequence relative to a second collection of documents that differs from the first collection of documents, and
  instructions for determining the second value based on the entropy;
instructions for applying one or more predefined rules to the sequence; and
instructions for identifying that the sequence is a semantic unit based on the first value and the second value and based on applying the one or more predefined rules.

25. The memory device of claim 24, where the coherence of the terms in the sequence is calculated as a likelihood ratio that defines a probability of the sequence occurring in the first collection of documents relative to parts of the sequence occurring individually in the first collection of documents.

26. The memory device of claim 24, where the instructions for identifying that the sequence as the semantic unit includes:
  instructions for comparing the first value to a first threshold associated with the coherence of the terms in the sequence;
  instructions for comparing the second value to a second threshold associated with the variation of the context of the sequence; and
  instructions for identifying that the sequence as the semantic unit based on comparing the first value to the first threshold and comparing the second value to the second threshold.

27. The memory device of claim 24, where entropy is based a distribution of terms that appear, in the second collection of documents, immediately before or after the sequence.

28. The memory device of claim 24, where the entropy, H(S), is calculated as:

$$H(S) = \mathrm{MIN}(HL(S), HR(S)), \text{ where}$$

and $$HL(S) = -\sum_w \frac{f(wS)}{f(S)} \cdot \log\left(\frac{f(wS)}{f(S)}\right), \text{ and}$$

$$HR(S) = -\sum_w \frac{f(Sw)}{f(S)} \cdot \log\left(\frac{f(Sw)}{f(S)}\right),$$

where MIN defines a minimum operation, S represents the sequence, HL(S) is entropy to a left of the sequence, HR(S) is entropy to a right of the sequence, f(wS) defines a number of times that a particular term, w, appears in the second collection of documents followed by the sequence, f(Sw) refers to a number of times that the sequence is followed by w in the second collection of documents, and f(S) refers to a number of times that the sequence S is present in the second collection of documents.

* * * * *

UNITED STATES PATENT AND TRADEMARK OFFICE
CERTIFICATE OF CORRECTION

| | | |
|---|---|---|
| PATENT NO. | : 8,140,321 B1 | Page 1 of 1 |
| APPLICATION NO. | : 12/503771 | |
| DATED | : March 20, 2012 | |
| INVENTOR(S) | : Thorsten Brants et al. | |

It is certified that error appears in the above-identified patent and that said Letters Patent is hereby corrected as shown below:

Column 9, claim 6, line 18, delete "," before the word where.

Column 9, claim 7, line 52, after "sequence" insert --S--.

Column 10, claim 8, line 11, after "sequence" insert --S--.

Column 10, claim 9, line 31, delete "," before the word where.

Column 11, claim 18, line 51, delete the word "and".

Column 12, claim 20, line 39, delete "," before the word where.

Column 14, claim 28, line 13, delete the word "and".

Signed and Sealed this
Twenty-fourth Day of April, 2012

David J. Kappos
*Director of the United States Patent and Trademark Office*